(12) United States Patent
Ozawa et al.

(10) Patent No.: US 10,914,349 B1
(45) Date of Patent: Feb. 9, 2021

(54) POWER UNIT OF UTILITY VEHICLE

(71) Applicant: KAWASAKI JUKOGYO KABUSHIKI KAISHA, Kobe (JP)

(72) Inventors: Shouji Ozawa, Kakogawa (JP); Yoshimoto Matsuda, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/554,880

(22) Filed: Aug. 29, 2019

(51) Int. Cl.
| F16D 48/06 | (2006.01) |
| F16H 37/02 | (2006.01) |
| F16H 3/093 | (2006.01) |
| F16H 37/06 | (2006.01) |

(52) U.S. Cl.
CPC ............ *F16D 48/06* (2013.01); *F16H 3/093* (2013.01); *F16H 37/027* (2013.01); *F16H 37/065* (2013.01); *F16D 2500/1088* (2013.01); *F16D 2500/10412* (2013.01); *F16H 2702/06* (2013.01)

(58) Field of Classification Search
None
See application file for complete search history.

(56) References Cited

U.S. PATENT DOCUMENTS

| 6,244,368 | B1* | 6/2001 | Ando | B60K 6/543 180/65.25 |
| 8,613,336 | B2 | 12/2013 | Deckard et al. | |
| 2002/0014958 | A1* | 2/2002 | Inoue | B60W 10/10 340/453 |
| 2011/0039652 | A1* | 2/2011 | Ekonen | F16H 37/065 475/220 |
| 2013/0178323 | A1* | 7/2013 | Ekonen | B60K 17/348 475/198 |
| 2014/0004995 | A1* | 1/2014 | Bolenbaugh | B60W 20/50 477/5 |
| 2016/0003208 | A1* | 1/2016 | Sakai | F16D 48/066 701/67 |
| 2018/0170359 | A1* | 6/2018 | Kim | B60W 20/00 |

* cited by examiner

*Primary Examiner* — Colby M Hansen
(74) *Attorney, Agent, or Firm* — Alleman Hall Creasman & Tuttle LLP

(57) ABSTRACT

A power unit of a utility vehicle includes a power source for travel of the utility vehicle, a continuously variable transmission, a gear transmission, and an output mechanism. The gear transmission includes a GT input shaft, a GT output shaft, and first and second GT intermediate shafts that transmit rotational power from the GT input shaft to the GT output shaft. The first GT intermediate shaft is disposed on one side with respect to the GT input shaft, and the second GT intermediate shaft is disposed on the other side with respect to the GT input shaft.

9 Claims, 7 Drawing Sheets

POWER UNIT OF UTILITY VEHICLE

BACKGROUND OF THE INVENTION

Field of the Invention

The present disclosure relates to a power unit of a utility vehicle.

Description of the Related Art

U.S. Pat. No. 8,613,336 B2 discloses a utility vehicle configured to travel on uneven terrains. Such a utility vehicle generally includes a power unit mounted in a vehicle body of the vehicle, the power unit including an engine and a continuously variable transmission (CVT).

Depending on the design requirements for the utility vehicle, it may be desired to widen the gear ratio range of the CVT. However, merely widening the gear ratio range of the CVT causes an expansion of the gear ratio region where the torque transmission efficiency is low. If the distance between the input shaft and output shaft (inter-shaft distance) of the CVT is increased in order to maintain a good torque transmission efficiency, the power unit increases in size, imposing a restriction on the layout of the utility vehicle.

SUMMARY OF THE INVENTION

An object of the present disclosure is to increase the design flexibility of a utility vehicle by providing a compact power unit while offering a wide gear ratio range along with the maintenance of a good torque transmission efficiency of a continuously variable transmission.

A power unit of a utility vehicle according to an aspect of the present disclosure includes: a power source for travel of the utility vehicle, the power source including a drive shaft that outputs rotational power; a continuously variable transmission including a CVT input shaft that receives the rotational power input from the drive shaft of the power source, a CVT output shaft that outputs the rotational power, a drive pulley mounted on the CVT input shaft, a driven pulley mounted on the CVT output shaft, and a belt wound around the drive pulley and the driven pulley; a gear transmission that receives rotational power input from the continuously variable transmission; and an output mechanism that receives rotational power output by the gear transmission and that outputs the rotational power to a drive wheel, wherein the gear transmission includes: a GT input shaft that receives the rotational power input from the CVT output shaft; a GT output shaft that outputs the rotational power to the output mechanism; a first GT intermediate shaft that transmits the rotational power from the GT input shaft to the GT output shaft; a second GT intermediate shaft that transmits the rotational power from the GT input shaft to the GT output shaft; a first speed-change gear pair mounted on the GT input shaft and the first GT intermediate shaft; a second speed-change gear pair mounted on the GT input shaft and the second GT intermediate shaft; a first transmission gear mounted on the first GT intermediate shaft to provide power transmission to the GT output shaft; and a second transmission gear mounted on the second GT intermediate shaft to provide power transmission to the GT output shaft, the drive shaft, the CVT input shaft, the CVT output shaft, the GT input shaft, the first GT intermediate shaft, the second GT intermediate shaft, and the GT output shaft extend in a first direction, the gear transmission is aligned with the continuously variable transmission in the first direction and aligned with the power source in a second direction perpendicular to the first direction, the first GT intermediate shaft is disposed on one side with respect to the GT input shaft in the second direction, and the second GT intermediate shaft is disposed on the other side with respect to the GT input shaft in the second direction.

With the above configuration, the serial connection of the continuously variable transmission and the gear transmission makes it possible to widen the gear ratio range of the power unit while ensuring a good torque transmission efficiency. Additionally, since the plurality of intermediate shafts provided in the gear transmission are arranged in a carefully designed layout, the power unit can be made compact in the first direction (e.g., a leftward/rightward direction). This can offer an increased design flexibility of the utility vehicle.

The above and further objects, features and advantages of the present disclosure will be more apparent from the following detailed description of preferred embodiments with reference to the accompanying drawings.

DETAILED DESCRIPTION OF THE EMBODIMENTS

Hereinafter, embodiments will be described with reference to the drawings.

First Embodiment

Figure 1:
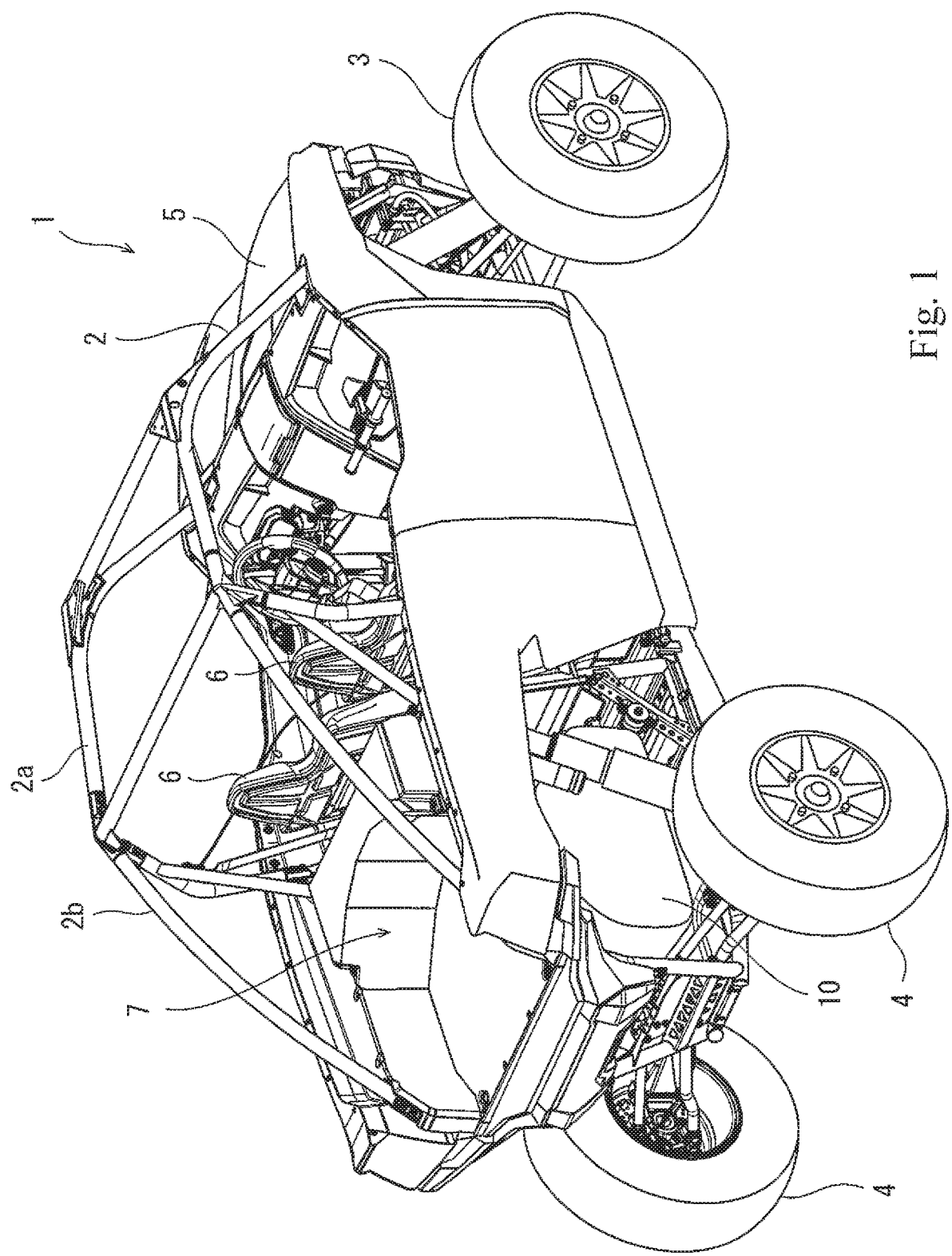
FIG. 1 is a perspective view of a utility vehicle according to a first embodiment.

FIG. 1 is a perspective view of a utility vehicle 1 according to a first embodiment. As shown in FIG. 1, the utility vehicle 1 includes a pair of left and right front wheels 3 supported by a front portion of a vehicle body frame 2 and a pair of left and right rear wheels 4 supported by a rear portion of the vehicle body frame 2. The space between the left and right front wheels 3 is covered from above by a hood 5 made of resin. A pair of occupant seats 6 (driver seat and passenger seat) are disposed rearwardly of the hood 5 and located in the vicinity of the center of the vehicle body frame 2 in a forward/rearward direction.

The vehicle body frame 2 includes a cabin frame part 2a and a pair of left and right rear gusset frame parts 2b. The vehicle body frame 2 is a pipe frame constructed of a plurality of pipe members connected together. The cabin frame part 2a is formed to surround the occupant space in which the occupant seats 6 are disposed. The occupant space surrounded by the cabin frame part 2a is exposed to the outside of the vehicle. The rear gusset frame parts 2b connect an upper portion of the cabin frame part 2a to a rear portion of a rear frame part (not illustrated). A cargo carrier 7 forming a recessed cargo-carrying space is provided rearwardly of the occupant seats 6. Below the cargo carrier 7 is mounted a power unit 10 to be described later (the power unit 10 is omitted in FIG. 1). When the utility vehicle 1 is a two-wheel-drive vehicle, the rear wheels 4 are the drive wheels, and when the utility vehicle 1 is a four-wheel-drive vehicle, the front wheels 3 and the rear wheels 4 are the drive wheels.

Figure 2:
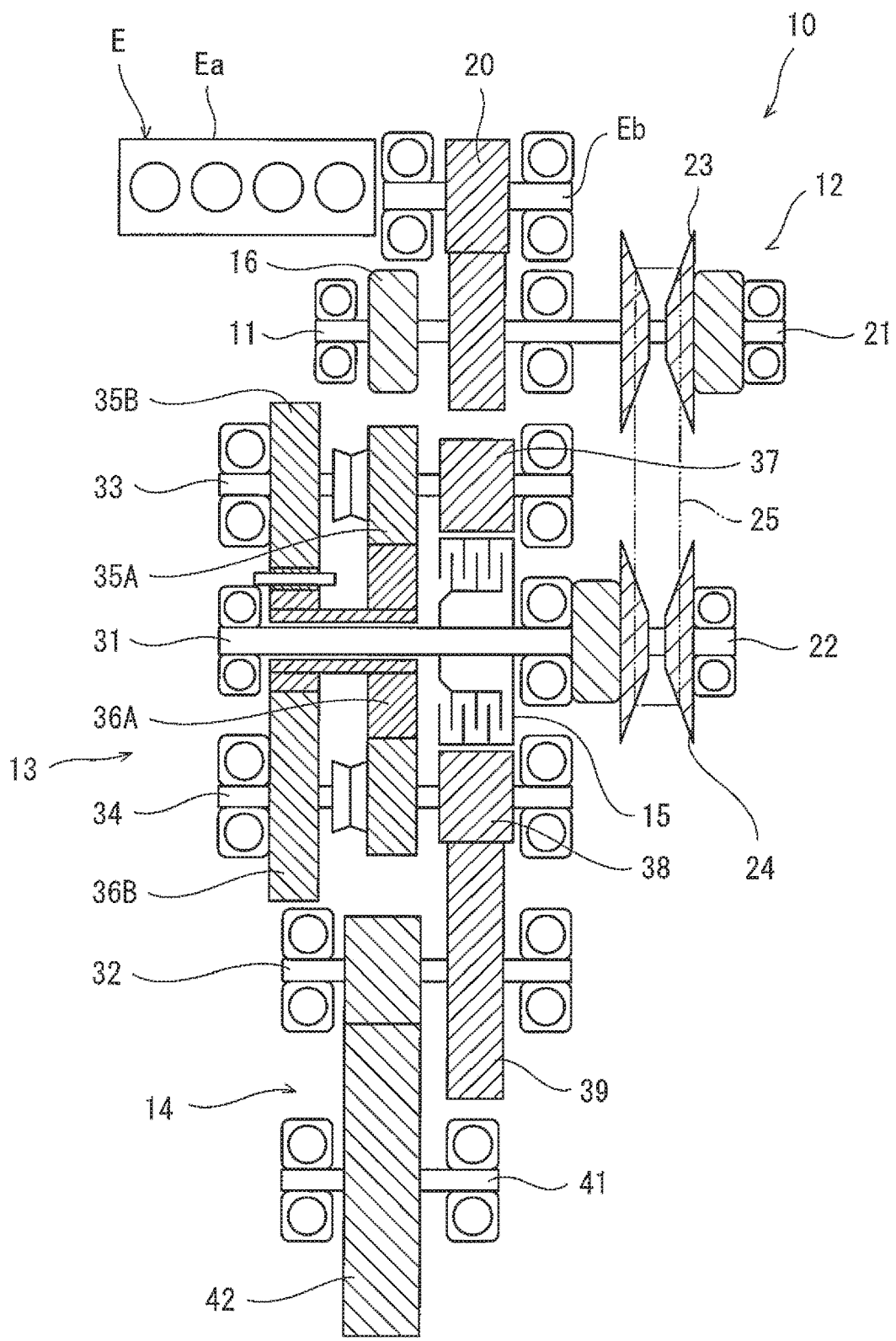
FIG. 2 is a developed view of a power unit of the utility vehicle shown in FIG. 1.

FIG. 2 is a developed view of the power unit 10 of the utility vehicle 1 shown in FIG. 1. As shown in FIG. 2, the power unit 10 includes an engine E (power source for travel of the utility vehicle), a reduced-speed shaft 11, a continuously variable transmission 12, a gear transmission 13, an output mechanism 14, a clutch 15, a pump 16, and a power unit case 17. The engine E is a multi-cylinder (e.g., four-cylinder) internal combustion engine. The engine E includes a cylinder unit Ea and a crankshaft Eb (drive shaft) located below the cylinder unit Ea. The crankshaft Eb extends, for example, in a leftward/rightward direction (first direction). The crankshaft Eb outputs rotational power generated by the cylinder unit Ea. An electric motor may be used as the power source instead of the engine (internal combustion engine).

The reduced-speed shaft 11 is disposed parallel to and rearwardly of the crankshaft Eb of the engine E. A speed-reduction gear pair 20 is mounted on the crankshaft Eb and the reduced-speed shaft 11 to transmit the rotation of the crankshaft Eb to the reduced-speed shaft 11 at a reduced rotational speed. The pump 16 is mounted on the reduced-speed shaft 11. That is, the pump 16 is driven by rotation of the reduced-speed shaft 11. The pump 16 is, for example, an oil pump for delivering a lubricating oil for lubrication of the engine E and the continuously variable transmission 12. The location of the pump 16 in the leftward/rightward direction overlaps with the location of the crankshaft Eb in the leftward/rightward direction. Any part of the pump 16 does not project outwardly of the crankshaft Eb in the leftward/rightward direction. When the engine E is used as the power source, the pump 16 may be a water pump for cooling the engine E.

The continuously variable transmission 12 is disposed outwardly of the engine E in the leftward/rightward direction. The continuously variable transmission 12 includes a CVT input shaft 21, a CVT output shaft 22, a drive pulley 23, a driven pulley 24, and a belt 25. The CVT input shaft 21 receives rotational power input from the crankshaft Eb. The CVT input shaft 21 is disposed coaxially with the reduced-speed shaft 11 and corotates with the reduced-speed shaft 11. The CVT input shaft 21 may be connected directly to the reduced-speed shaft 11, may be connected indirectly to the reduced-speed shaft 11, or may be formed integrally with the reduced-speed shaft 11.

The CVT output shaft 22 outputs rotational power to the gear transmission 13. The CVT input shaft 21 and the CVT output shaft 22 extend in the leftward/rightward direction. The drive pulley 23 is mounted on the CVT input shaft 21. The driven pulley 24 is mounted on the CVT output shaft 22. The belt 25 is wound around the drive pulley 23 and driven pulley 24. The belt 25 is made of, for example, a non-metallic material (such as rubber or resin).

The gear transmission 13 is aligned with the continuously variable transmission 12 in the leftward/rightward direction and aligned with the engine E in the forward/rearward direction (second direction). The gear transmission 13 is a dog clutch transmission. The gear transmission 13 includes a GT input shaft 31, a GT output shaft 32, a first GT intermediate shaft 33, a second GT intermediate shaft 34, first speed-change gear pairs 35A and 35B, second speed-change gear pairs 36A and 36B, a first transmission gear 37, a second transmission gear 38, and a common output gear 39.

The GT input shaft 31 receives rotational power input from the CVT output shaft 22. The GT input shaft 31 is disposed coaxially with the CVT output shaft 22. The CVT output shaft 22 may be rotatably inserted in the GT input shaft 31. When the clutch 15 described later is disengaged, the GT input shaft 31 is rotatable independently of the CVT output shaft 22, while when the clutch 15 described later is engaged, the GT input shaft 31 corotates with the CVT output shaft 22.

The GT output shaft 32 outputs rotational power to the output mechanism 14. The first GT intermediate shaft 33 transmits rotational power to the GT output shaft 32 from the GT input shaft 31. The second GT intermediate shaft 34 also transmits rotational power to the GT output shaft 32 from the GT input shaft 31. The first GT intermediate shaft 33 is disposed forwardly of the GT input shaft 31, while the second GT intermediate shaft 34 is disposed rearwardly of the GT input shaft 31. That is, the first GT intermediate shaft 33 and the second GT intermediate shaft 34 are opposed with respect to the GT input shaft 31 in the forward/rearward direction. The GT input shaft 31, the GT output shaft 32, the first GT intermediate shaft 33, and the second GT intermediate shaft 34 extend in the leftward/rightward direction.

On the GT input shaft 31 and the first GT intermediate shaft 33 are mounted a plurality of (e.g., two) first speed-change gear pairs 35A and 35B. On the GT input shaft 31 and the second GT intermediate shaft 34 are mounted a plurality of (e.g., two) second speed-change gear pairs 36A and 36B. That is, the speed of the rotation to be transmitted from the GT input shaft 31 is changed through any of the first speed-change gear pairs 35A and 35B and second speed-change gear pairs 36A and 36B, and the rotation at the changed speed is transmitted to the GT output shaft 32. For example, the first speed-change gear pair 35A corresponds to a "third gear position", the first speed-change gear pair 35B corresponds to a "reverse position", the second speed-change gear pair 36A corresponds to a "second gear position", and the second speed-change gear pair 36B corresponds to a "first gear position". The correspondence relationship between the gear pairs and the gear positions is not limited to this example.

The first transmission gear 37 is mounted on the first GT intermediate shaft 33 so as to corotate with the first GT intermediate shaft 33. The second transmission gear 38 is mounted on the second GT intermediate shaft 34 so as to corotate with the second GT intermediate shaft 34. The common output gear 39 is mounted on the GT output shaft 32 so as to corotate with the GT output shaft 32. The first transmission gear 37 and the second transmission gear 38 are aligned with each other in the forward/rearward direction and are in mesh with the common output gear 39.

That is, the rotation of the first GT intermediate shaft 33 is transmitted to the GT output shaft 32 via the first transmission gear 37 and the common output gear 39, and the rotation of the second GT intermediate shaft 34 is transmitted to the GT output shaft 32 via the second transmission gear 38 and the common output gear 39. Thus, a first speed change route passing through the first GT intermediate shaft 33 and a second speed change route passing through the second GT intermediate shaft 34 are arranged in parallel between the GT input shaft 31 and the GT output shaft 32. That is, the rotation of the GT input shaft 31 is transmitted to the GT output shaft 32 through either the first speed change route or the second speed change route.

The clutch 15 is mounted around the axis of the GT input shaft 31. The clutch 15 is configured to disable and enable power transmission from the CVT output shaft 22 to the GT input shaft 31. The clutch 15 is, for example, a multi-plate clutch. The location of the clutch 15 in the leftward/rightward direction overlaps with the location of the first transmission gear 37 and second transmission gear 38 in the leftward/rightward direction.

The output mechanism 14 receives rotational power output by the gear transmission 13 and outputs the rotational power to the drive wheels (front wheels 3 and/or rear wheels 4). The output mechanism 14 includes a final shaft 41 disposed parallel to the GT output shaft 32 and a final gear pair 42 mounted on the GT output shaft 32 and final shaft 41. The final shaft 41 and final gear pair 42 are disposed rearwardly of the GT output shaft 32.

The speed-reduction gear pair 20, first transmission gear 37, clutch 15, second transmission gear 38, and common output gear 39 are arranged in such a manner that their locations in the leftward/rightward direction overlap with one another (their locations in the leftward/rightward direction coincide with one another in FIG. 2). The pump 16, first speed-change gear pair 35A, second speed-change gear pair 36A, and final gear pair 42 are arranged in such a manner that their locations in the leftward/rightward direction overlap with one another (their locations in the leftward/rightward direction coincide with one another in FIG. 2). The first speed-change gear pair 35B and second speed-change gear pair 36B are arranged in such a manner that their locations in the leftward/rightward direction overlap with each other (their locations in the leftward/rightward direction coincide with each other in FIG. 2). That is, in the example of FIG. 2, the gear transmission 13 includes three gear trains.

Figure 3:
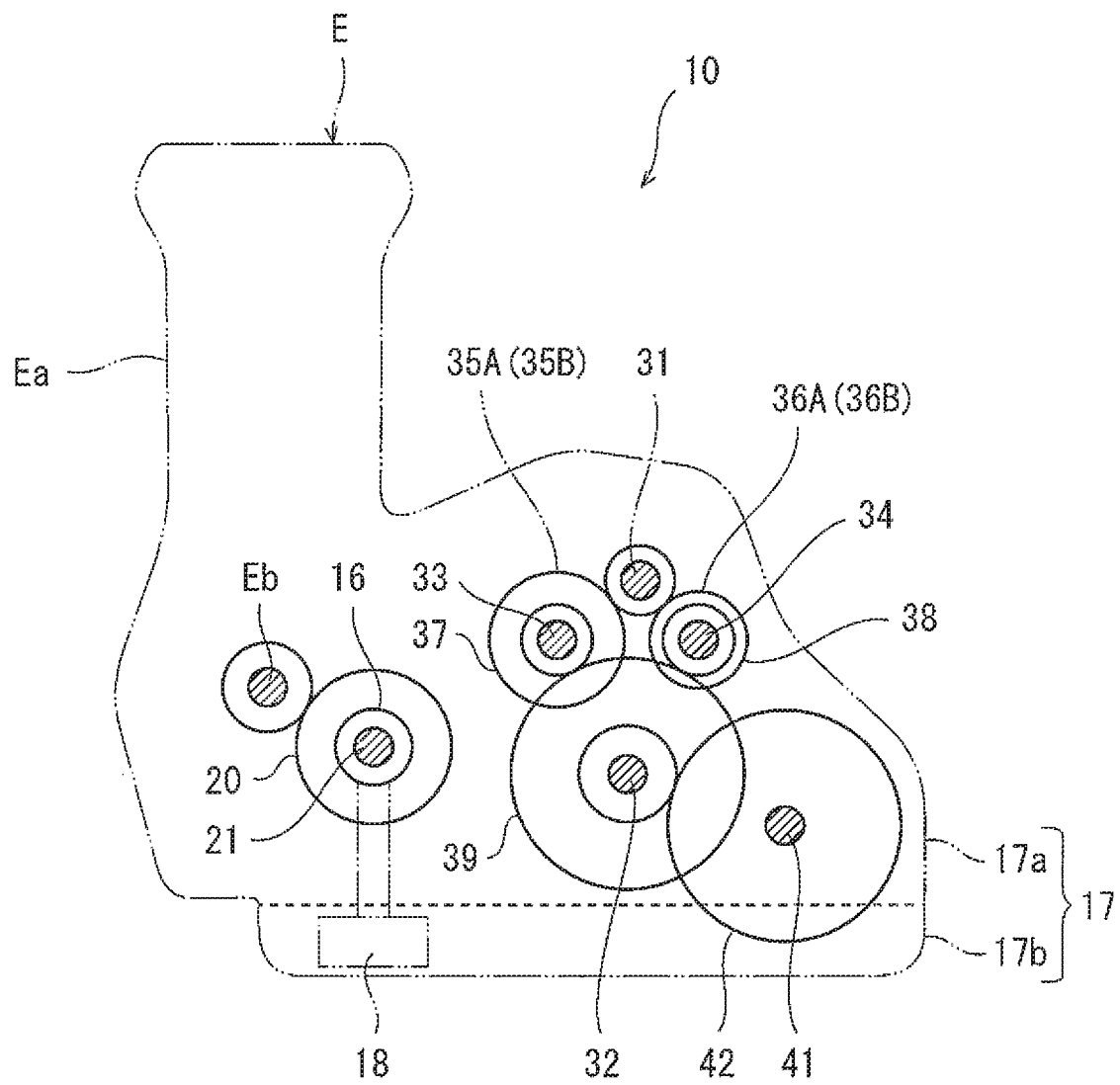
FIG. 3 is a side view of the power unit shown in FIG. 2.

FIG. 3 is a side view of the power unit 10 shown in FIG. 2. As shown in FIG. 3, the power unit 10 includes a power unit case 17 continuous with the rear of the engine E. The power unit case 17 houses the crankshaft Eb, the reduced-speed shaft 11, the continuously variable transmission 12, the gear transmission 13, the output mechanism 14, the clutch 15, and the pump 16. The power unit case 17 includes a case body 17a and an oil pan 17b provided below the case body 17a. The oil pan 17b reserves a lubricating oil, and the lubricating oil is sucked up by the action of suction force of the pump 16 through a strainer 18.

The CVT input shaft 21, and therefore the reduced-speed shaft 11, are disposed rearwardly of the crankshaft Eb. The CVT input shaft 21 is disposed below the crankshaft Eb. The GT input shaft 31, and therefore the CVT output shaft 22, are disposed rearwardly of the CVT input shaft 21. The GT input shaft 31 is disposed above the crankshaft Eb. The first GT intermediate shaft 33 and second GT intermediate shaft 34 are disposed below the GT input shaft 31. The first GT intermediate shaft 33 and second GT intermediate shaft 34 are disposed above the CVT input shaft 21. The first GT intermediate shaft 33 is disposed between the CVT input shaft 21 and the GT input shaft 31.

The GT output shaft 32 is disposed below the first GT intermediate shaft 33 and the second GT intermediate shaft 34. The GT output shaft 32 is disposed rearwardly of the first GT intermediate shaft 33 and forwardly of the second GT intermediate shaft 34. The GT output shaft 32 is disposed below the crankshaft Eb. The final shaft 41 is disposed rearwardly of and below the GT output shaft 32. The speed-reduction gear pair 20 and common output gear 39 are disposed above the oil pan 17b. A part of the final gear pair 42 lies within the oil pan 17b.

Figure 4:
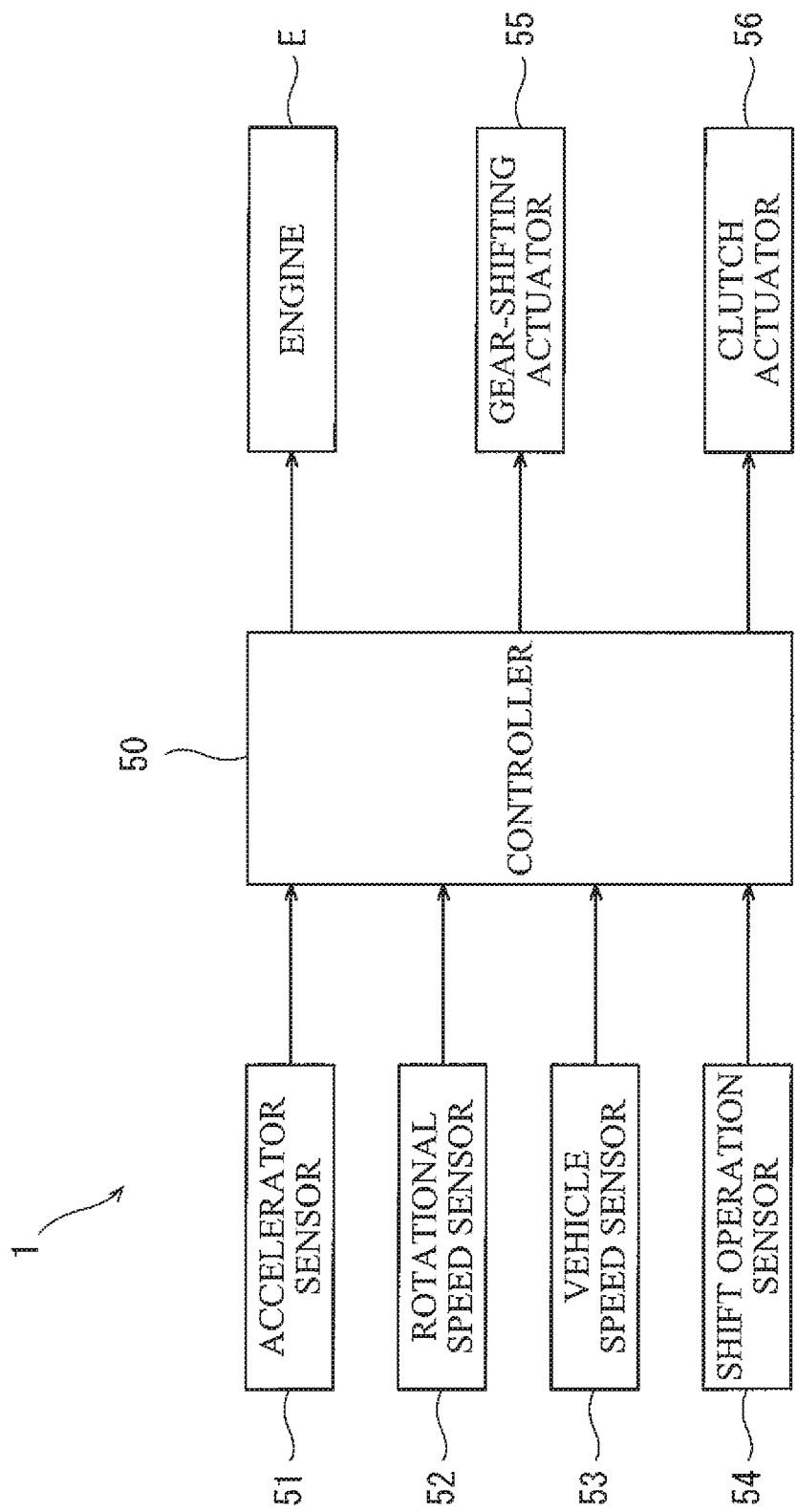
FIG. 4 is a block diagram of a control system of the utility vehicle shown in FIG. 1.

FIG. 4 is a block diagram of a control system of the utility vehicle 1 shown in FIG. 1. The utility vehicle 1 includes a controller 50. The utility vehicle 1 includes an accelerator sensor 51, a rotational speed sensor 52, a vehicle speed sensor 53, and a shift operation sensor 54, which are provided on the input side of the controller 50. The accelerator sensor 51 is a sensor that detects the amount of operation of an acceleration operation member (e.g., an accelerator pedal) by a driver. The rotational speed sensor 52 is a sensor that detects the engine speed (in particular the rotational speed of the crankshaft Eb). The vehicle speed sensor 53 is a sensor that detects the travel speed of the utility vehicle 1. The shift operation sensor 54 is a sensor that detects the position of a gear-shifting operation member (e.g., a shift lever) operated by the driver (gear position command).

The utility vehicle 1 includes the engine E, a gear-shifting actuator 55, and a clutch actuator 56, which are provided on the output side of the controller 50. The gear-shifting actuator 55 generates gear-shifting power for the gear transmission 13. That is, the gear-shifting actuator 55 drives a shift drum (not illustrated) to move shift forks (not illustrated) and hence dogs (not illustrated), thereby accomplishing a gear-shifting process. The gear-shifting actuator 55 is, for example, an electric motor. The clutch actuator 56 generates power for actuating the clutch 15. For example, the clutch 15 is a clutch actuated by hydraulic pressure, and the clutch actuator 56 is a hydraulic pump.

The controller 50 controls the engine E based on detection signals received from the accelerator sensor 51, rotational speed sensor 52, and vehicle speed sensor 53. The controller 50 controls the gear-shifting actuator 55 and clutch actuator 56 based on detection signals received from the shift operation sensor 54. Upon receiving a gear position command from the shift operation sensor 54, the controller 50 controls the clutch actuator 56 to bring the clutch 15 into a disengaged state. Subsequently, the controller 50 controls the gear-shifting actuator 55 in such a manner that a desired speed-change gear pair is selected from the first speed-change gear pairs 35A and 35B and second speed-change gear pairs 36A and 36B. Next, the controller 50 controls the clutch actuator 56 to bring the clutch 15 back into an engaged state. Upon receiving a neutral position command from the shift operation sensor 54, the controller 50 controls the clutch actuator 56 to bring the clutch 15 into a disengaged state.

With the configuration described above, the serial connection of the continuously variable transmission 12 and the gear transmission 13 makes it possible to widen the gear ratio range of the power unit 10 while ensuring a good torque transmission efficiency. Additionally, since the plurality of GT intermediate shafts 33 and 34 provided in the gear transmission 13 are arranged in a carefully designed layout, the power unit 10 can be made compact in the leftward/rightward direction. This can offer an increased design flexibility of the utility vehicle 1.

Additionally, since the first transmission gear 37 and the second transmission gear 38 are aligned with each other in the forward/rearward direction and are in mesh with the common output gear 39, the size of the space occupied by the first transmission gear 37, second transmission gear 38, and common output gear 39 can be reduced in the leftward/rightward direction, and the power unit 10 can be made compact in the leftward/rightward direction.

Additionally, since the location of the clutch 15 in the leftward/rightward direction overlaps with the location of the first transmission gear 37 and second transmission gear 38 in the leftward/rightward direction, the clutch 15 is disposed with high space efficiency, and the power unit 10 can be made compact in the leftward/rightward direction.

Additionally, since the controller 50, upon receiving a neutral position command from the shift operation sensor 54, controls the clutch actuator 56 to bring the clutch 15 into a disengaged state, the shifting to the neutral position can be achieved by using the clutch 15 interposed between the continuously variable transmission 12 and the gear transmission 13 while the route of power transmission from the engine E to the continuously variable transmission 12 is left in a power transmission state. This eliminates the need for a centrifugal clutch interposed between the engine E and the continuously variable transmission 12, thereby preventing an increase in the number of components.

Additionally, since the location of the pump 16 in the leftward/rightward direction overlaps with the location of the crankshaft Eb in the leftward/rightward direction, the pump 16 is disposed with high space efficiency, and the power unit 10 can be made compact in the leftward/rightward direction.

Additionally, since the crankshaft Eb, CVT input shaft 21, CVT output shaft 22, GT input shaft 31, GT output shaft 32, first GT intermediate shaft 33, and second GT intermediate shaft 34 are arranged as shown in FIG. 3, the power unit 10 can be made compact in the forward/rearward direction by virtue of the carefully designed layout of these shafts.

Second Embodiment

Figure 5:
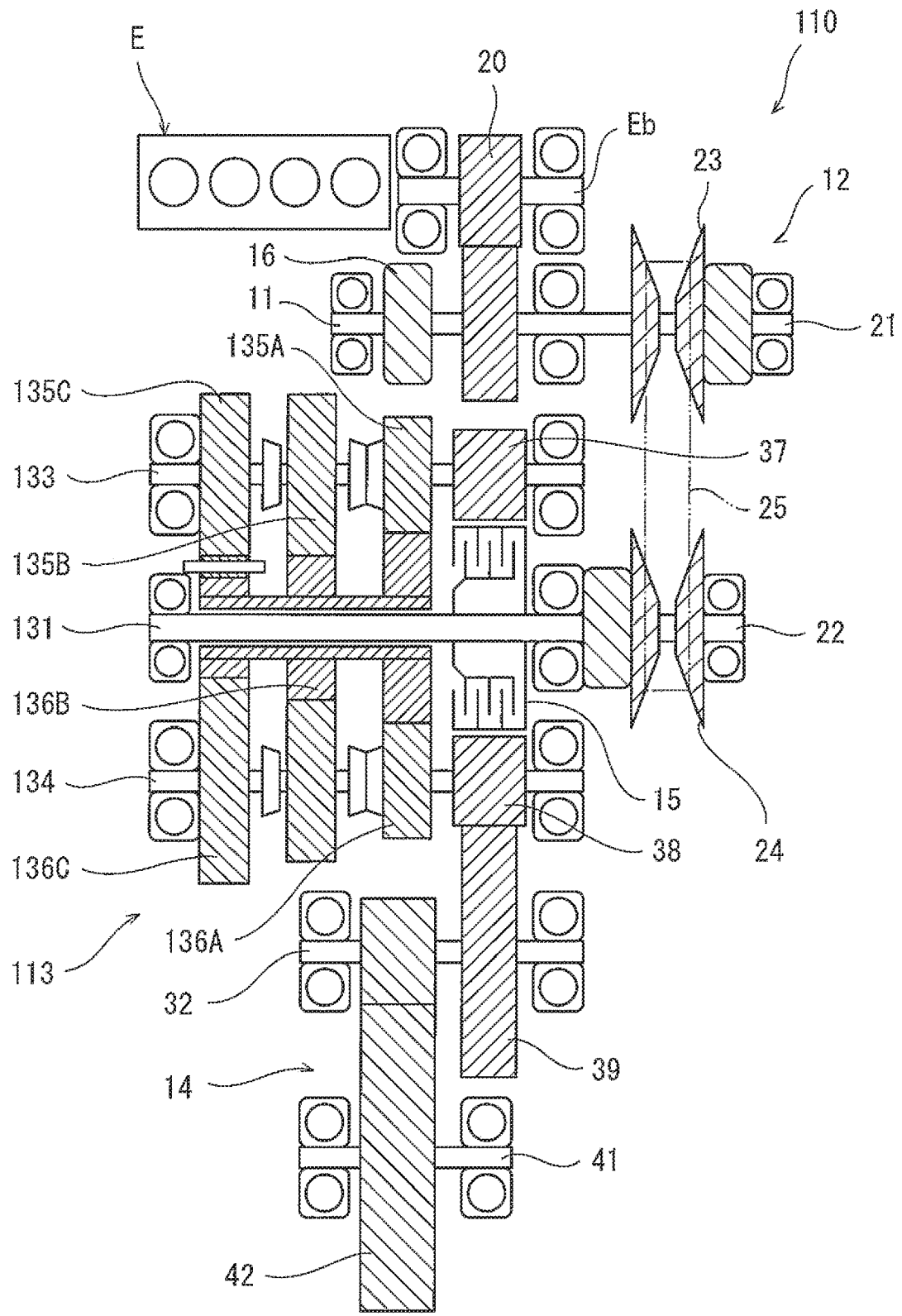
FIG. 5 shows a power unit of a second embodiment in the same manner as FIG. 2 shows the power unit of the first embodiment.

FIG. 5 shows a power unit 110 of a second embodiment in the same manner as FIG. 2 shows the power unit of the first embodiment. The elements identical to those of the first embodiment are denoted by the same reference signs and will not be described again. As shown in FIG. 5, the power unit 110 of the second embodiment includes a gear transmission 113 having more gear positions than the gear transmission of the first embodiment. The power unit 110 includes a GT input shaft 131, a first GT intermediate shaft 133, and a second GT intermediate shaft 134, which are longer than the corresponding shafts of the first embodiment.

Three first speed-change gear pairs 135A, 135B, and 135C are mounted on the GT input shaft 131 and first GT intermediate shaft 133. Three second speed-change gear pairs 136A, 136B, and 136C are mounted on the GT input shaft 131 and second GT intermediate shaft 134. That is, the speed of the rotation to be transmitted from the GT input shaft 131 is changed through any of the first speed-change gear pairs 135A, 135B, and 135C and second speed-change gear pairs 136A, 136B, and 136C, and the rotation at the changed speed is transmitted to the GT output shaft 32. For example, the first speed-change gear pair 135A corresponds to a "fifth gear position", the first speed-change gear pair 135B corresponds to a "third gear position", the first speed-change gear pair 135C corresponds to a "reverse position", the second speed-change gear pair 136A corresponds to a "fourth gear position", the second speed-change gear pair 136B corresponds to a "second gear position", and the second speed-change gear pair 136C corresponds to a "first gear position". The correspondence relationship between the gear pairs and the gear positions is not limited to this example.

The speed-reduction gear pair 20, first transmission gear 37, clutch 15, second transmission gear 38, and common output gear 39 are arranged in such a manner that their locations in the leftward/rightward direction overlap with one another (their locations in the leftward/rightward direction coincide with one another in FIG. 5). The pump 16, first speed-change gear pair 135A, second speed-change gear pair 136A, and final gear pair 42 are arranged in such a manner that their locations in the leftward/rightward direction overlap with one another (their locations in the leftward/rightward direction coincide with one another in FIG. 5). The first speed-change gear pair 135B and second speed-change gear pair 136B are arranged in such a manner that their locations in the leftward/rightward direction overlap with each other (their locations in the leftward/rightward direction coincide with each other in FIG. 5). The first speed-change gear pair 135C and second speed-change gear pair 136C are arranged in such a manner that their locations in the leftward/rightward direction overlap with each other (their locations in the leftward/rightward direction coincide with each another in FIG. 5). That is, in the example of FIG. 5, the gear transmission 113 includes four gear trains. The other elements are the same as those of the first embodiment described above and will therefore not be described again.

Third Embodiment

Figure 6:
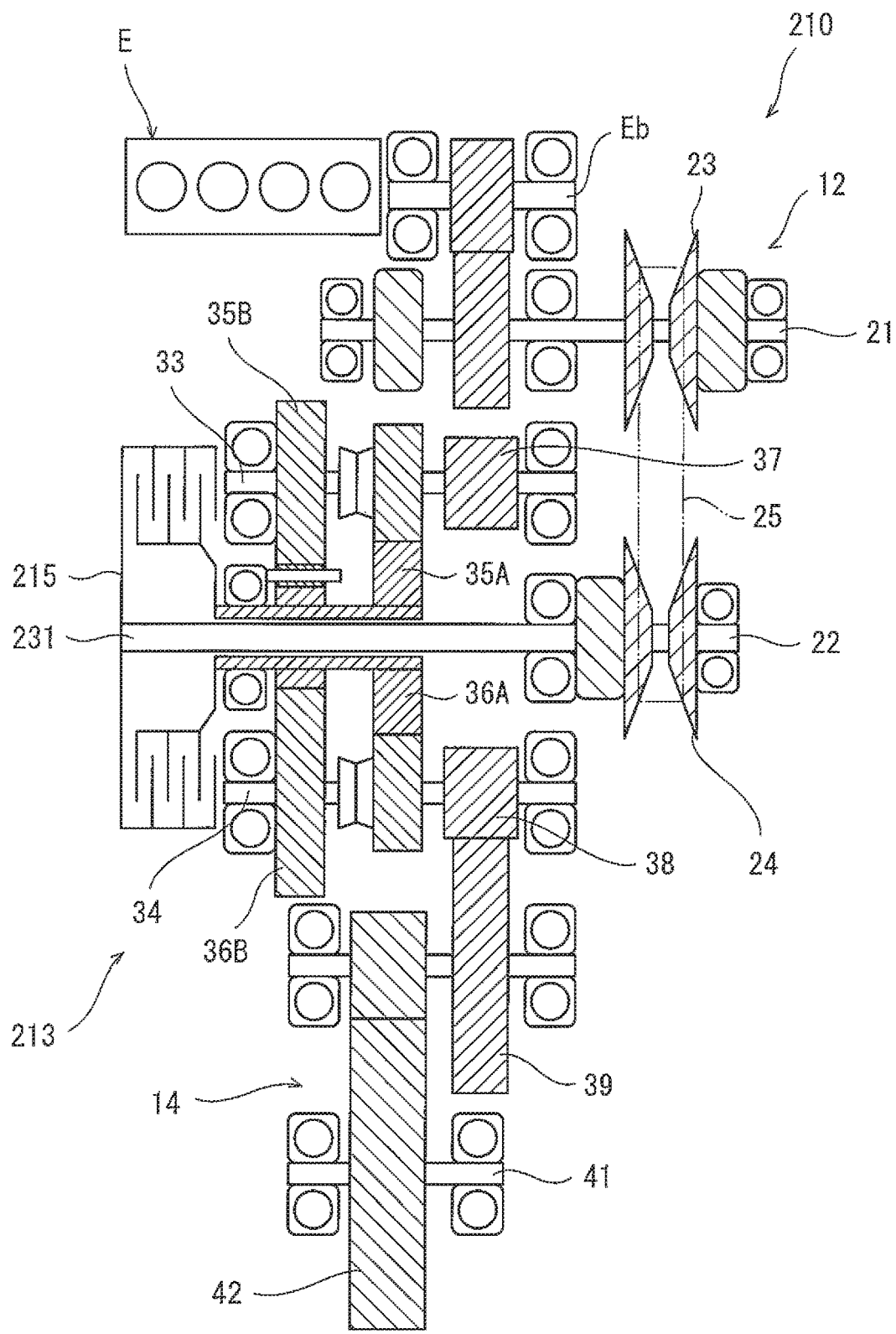
FIG. 6 shows a power unit of a third embodiment in the same manner as FIG. 2 shows the power unit of the first embodiment.

FIG. 6 shows a power unit 210 of a third embodiment in the same manner as FIG. 2 shows the power unit of the first embodiment. The elements identical to those of the first embodiment are denoted by the same reference signs and will not be described again. As seen from FIG. 6, the difference of the power unit 210 of the third embodiment from the power unit of the first embodiment lies in how a clutch 215 is disposed. The power unit 210 includes a GT input shaft 231, which is longer than the corresponding shaft of the first embodiment. The GT input shaft 231 projects beyond the first GT intermediate shaft 33 and the second GT intermediate shaft 34 on a side (left side in FIG. 6) remote from the continuously variable transmission 12 in the leftward/rightward direction.

The clutch 215 is mounted on an end (left end in FIG. 6) of the GT input shaft 231, the end being remote from the continuously variable transmission 12. The clutch 215 is disposed at a location displaced from the first GT intermediate shaft 33 and second GT intermediate shaft 34 in the leftward/rightward direction. The clutch 215 has a larger diameter than the corresponding clutch of the first embodiment. The clutch 215, as viewed in the leftward/rightward direction, overlaps with the first GT intermediate shaft 33 and second GT intermediate shaft 34. With this configuration, the first GT intermediate shaft 33 and the second GT intermediate shaft 34 can be disposed close to the GT input shaft 231 in the forward/rearward direction despite the presence of the clutch 215, and the power unit 210 can be made compact in the forward/rearward direction. The other elements are the same as those of the first embodiment described above and will therefore not be described again.

Fourth Embodiment

Figure 7:
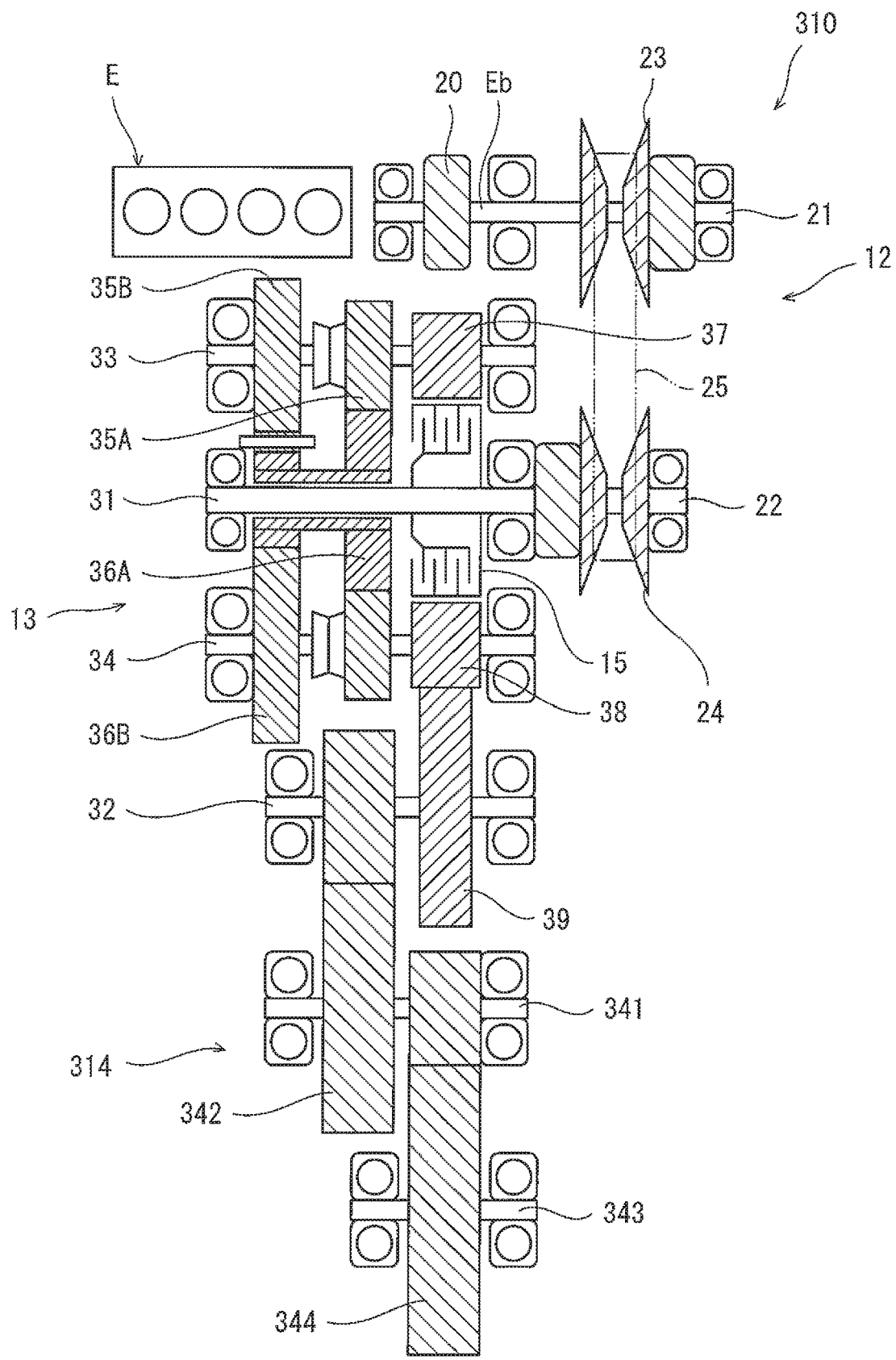
FIG. 7 shows a power unit of a fourth embodiment in the same manner as FIG. 2 shows the power unit of the first embodiment.

FIG. 7 shows a power unit 310 of a fourth embodiment in the same manner as FIG. 2 shows the power unit of the first embodiment. The elements identical to those of the first embodiment are denoted by the same reference signs and will not be described again. As shown in FIG. 7, the crankshaft Eb and the CVT input shaft 21 are disposed coaxially with each other. That is, the power unit 310 of the fourth embodiment does not include the reduced-speed shaft 11 as provided in the first embodiment. The CVT input shaft 21 may be connected directly to the crankshaft Eb, may be connected indirectly to the crankshaft Eb, or may be formed integrally with the crankshaft Eb.

The pump 16 is mounted coaxially with the crankshaft Eb and CVT input shaft 21. Specifically, the pump 16 is mounted on the crankshaft Eb. That is, the pump 16 is disposed between the engine E and the continuously variable transmission 12 instead of a centrifugal clutch which would be disposed between the engine E and the continuously variable transmission 12 in a conventional configuration while shifting to the neutral position is enabled by disengagement of the clutch 15 disposed between the continuously variable transmission 12 and the gear transmission 13. This contributes to making the power unit compact.

An output mechanism 314 includes a pre-final shaft 341 disposed parallel to the GT output shaft 32, a pre-final gear pair 342 mounted on the GT output shaft 32 and pre-final shaft 341, a final shaft 343 disposed parallel to the pre-final shaft 341, and a final gear pair 344 mounted on the pre-final shaft 341 and final shaft 343. The pre-final shaft 341 is disposed rearwardly of the GT output shaft 32, and the final shaft 343 is disposed rearwardly of the pre-final shaft 341. The gears of the pre-final gear pair 342 and final gear pair 344 are speed-reduction gears. That is, speed-reduction gears are disposed downstream of the GT output shaft 32 in the power transmission route instead of disposing speed-reduction gears between the crankshaft Eb and the CVT input shaft 21.

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. The details of the structure and/or function may be varied substantially without departing from the scope of the invention.

What is claimed is:

1. A power unit of a utility vehicle, comprising:
    a power source for travel of the utility vehicle, the power source comprising a drive shaft that outputs rotational power;
    a continuously variable transmission comprising a CVT input shaft that receives the rotational power input from the drive shaft of the power source, a CVT output shaft that outputs the rotational power, a drive pulley mounted on the CVT input shaft, a driven pulley mounted on the CVT output shaft, and a belt wound around the drive pulley and the driven pulley;
    a gear transmission that receives rotational power input from the continuously variable transmission; and
    an output mechanism that receives rotational power output by the gear transmission and that outputs the rotational power to a drive wheel, wherein
    the gear transmission comprises:
        a GT input shaft that receives the rotational power input from the CVT output shaft;
        a GT output shaft that outputs the rotational power to the output mechanism;
        a first GT intermediate shaft that transmits the rotational power from the GT input shaft to the GT output shaft;
        a second GT intermediate shaft that transmits the rotational power from the GT input shaft to the GT output shaft;
        a first speed-change gear pair mounted on the GT input shaft and the first GT intermediate shaft;
        a second speed-change gear pair mounted on the GT input shaft and the second GT intermediate shaft;
        a first transmission gear mounted on the first GT intermediate shaft to provide power transmission to the GT output shaft; and
        a second transmission gear mounted on the second GT intermediate shaft to provide power transmission to the GT output shaft,
    the drive shaft, the CVT input shaft, the CVT output shaft, the GT input shaft, the first GT intermediate shaft, the second GT intermediate shaft, and the GT output shaft extend in a first direction,
    the gear transmission is aligned with the continuously variable transmission in the first direction and aligned with the power source in a second direction perpendicular to the first direction,
    the first GT intermediate shaft is disposed on one side with respect to the GT input shaft in the second direction, and
    the second GT intermediate shaft is disposed on the other side with respect to the GT input shaft in the second direction.

2. The power unit according to claim 1, wherein
    the gear transmission comprises a common output gear mounted on the GT output shaft, and
    the first transmission gear and the second transmission gear are aligned with each other in the second direction and are in mesh with the common output gear.

3. The power unit according to claim 1, further comprising a clutch configured to disable power transmission from the CVT output shaft to the GT input shaft, wherein
    the clutch is disposed around an axis of the GT input shaft, and
    the location of the clutch in the first direction overlaps with the location of at least one of the first transmission gear and the second transmission gear in the first direction.

4. The power unit according to claim 3, further comprising:
    a clutch actuator that actuates the clutch; and
    a controller that, upon receiving a predetermined neutral position command, controls the clutch actuator to bring the clutch into a disengaged state.

5. The power unit according to claim 1, further comprising a clutch configured to disable power transmission from the CVT output shaft to the GT input shaft, wherein
    the clutch is mounted on an end of the GT input shaft, the end being remote from the continuously variable transmission, and
    the clutch is disposed at a location displaced from the first GT intermediate shaft and the second GT intermediate shaft in the first direction.

6. The power unit according to claim 5, further comprising:
    a clutch actuator that actuates the clutch; and
    a controller that, upon receiving a predetermined neutral position command, controls the clutch actuator to bring the clutch into a disengaged state.

7. The power unit according to claim 1, further comprising:
    a reduced-speed shaft disposed parallel to the drive shaft of the power source and coaxially with the CVT input shaft;
    a speed-reduction gear pair mounted on the drive shaft and the reduced-speed shaft; and a pump mounted on the reduced-speed shaft, wherein
the location of the pump in the first direction overlaps with the location of the drive shaft in the first direction.

8. The power unit according to claim 1, wherein
the CVT output shaft and the GT input shaft are disposed coaxially with each other,
the drive shaft, the CVT input shaft, and the GT input shaft are arranged in this order on one side of the power unit in the second direction,
the CVT input shaft is disposed below the drive shaft,
the GT input shaft is disposed above the drive shaft,
the first GT intermediate shaft and the second GT intermediate shaft are disposed below the GT input shaft, and
the GT output shaft is disposed below the first GT intermediate shaft and the second GT intermediate shaft.

9. The power unit according to claim 1, further comprising: a clutch configured to disable power transmission from the CVT output shaft to the GT input shaft; and a pump driven by the drive shaft of the power source, wherein
the drive shaft and the CVT input shaft are disposed coaxially with each other, and
the pump is mounted coaxially with the drive shaft and the CVT input shaft.

\* \* \* \* \*